May 3, 1966 B. R. CLAY ETAL 3,249,692
READER EMPLOYING OPTICAL FIBERS
Filed June 6, 1960 6 Sheets-Sheet 2

INVENTORS,
BURTON R. CLAY &
BY VINCENT F. RYAN, JR.
John V. Regan
ATTORNEY

INVENTORS
BURTON R. CLAY &
BY VINCENT F. RYAN, JR.

John V. Regan
ATTORNEY

United States Patent Office 3,249,692
Patented May 3, 1966

3,249,692
READER EMPLOYING OPTICAL FIBERS
Burton R. Clay, Wayland, Mass., and Vincent F. Ryan, Jr., Haddonfield, N.J., assignors to Radio Corporation of America, a corporation of Delaware
Filed June 6, 1960, Ser. No. 34,050
28 Claims. (Cl. 178—7.1)

The invention described in this application is a new and improved system for converting an optically represented analog quantity into a digital quantity. The invention is particularly useful for rapidly and automatically reading coordinates of a curve.

There is a requirement in certain industries for an efficient, economical, and highly accurate system for deriving from data recorded on charts or the like information for controlling an industrial process. The natural gas industry is one example. Currently, highly trained, skilled operators are required to perform the chart analysis and the procedure is both time consuming and subject to human error.

A specific object of the present invention is to provide an automatic system for determining the coordinates of any or all points on a curve.

Another specific object of the invention is to provide a system for automatically deriving from a curve, information in digital form as to the coordinates of the curve and applying this information directly to a computer.

Another object of the invention is to provide a system for automatically obtaining from a curve, the trace of which varies in thickness, the coordinates of the center of the trace.

A more general object of the present invention is to provide a system for converting an optically represented analog quantity into a digital quantity.

According to the invention, a fiber optics transducer is arranged adjacent to the optically represented analog quantity at one end of the transducer. The other end of the transducer is scanned to obtain light pulses indicative of the value of the analog quantity.

In a form of the invention suitable for reading the coordinates of a curve, the end of the fiber optics transducer adjacent to the curve may be in the form of a line of fiber optics parallel to one of the curve coordinates. The other end of the transducer may be in the form of a semi or full circle. The curve is moved past the line of fiber optics in a direction parallel to another curve coordinate. The circular end of the fiber optics transducer is scanned as, for example, by successively exposing the fibers along the curve to a light responsive means such as a phototube. The scanning rate is substantially higher than the rate at which the curve is moved, whereby coordinates for a large number of points on the curve may readily be obtained.

An important feature of the invention is its ability to read the coordinates at the center of the curve trace, even though the trace thickness varies. This is done by producing a count indicative of the distance in units $u$ between a reference position and a point on the curve and then producing a count indicative of the width of the curve at that point in units $2u$. The sum of the two counts is the distance to the center of the curve.

Another important feature of one embodiment of the invention is the means for reading the curve by reflected rather than transmitted light. In this embodiment, light is applied to and received from the curve through the same fiber optics transducer.

The invention will be described in greater detail by reference to the following description taken in connection with the accompanying drawing in which.

Figure 1:
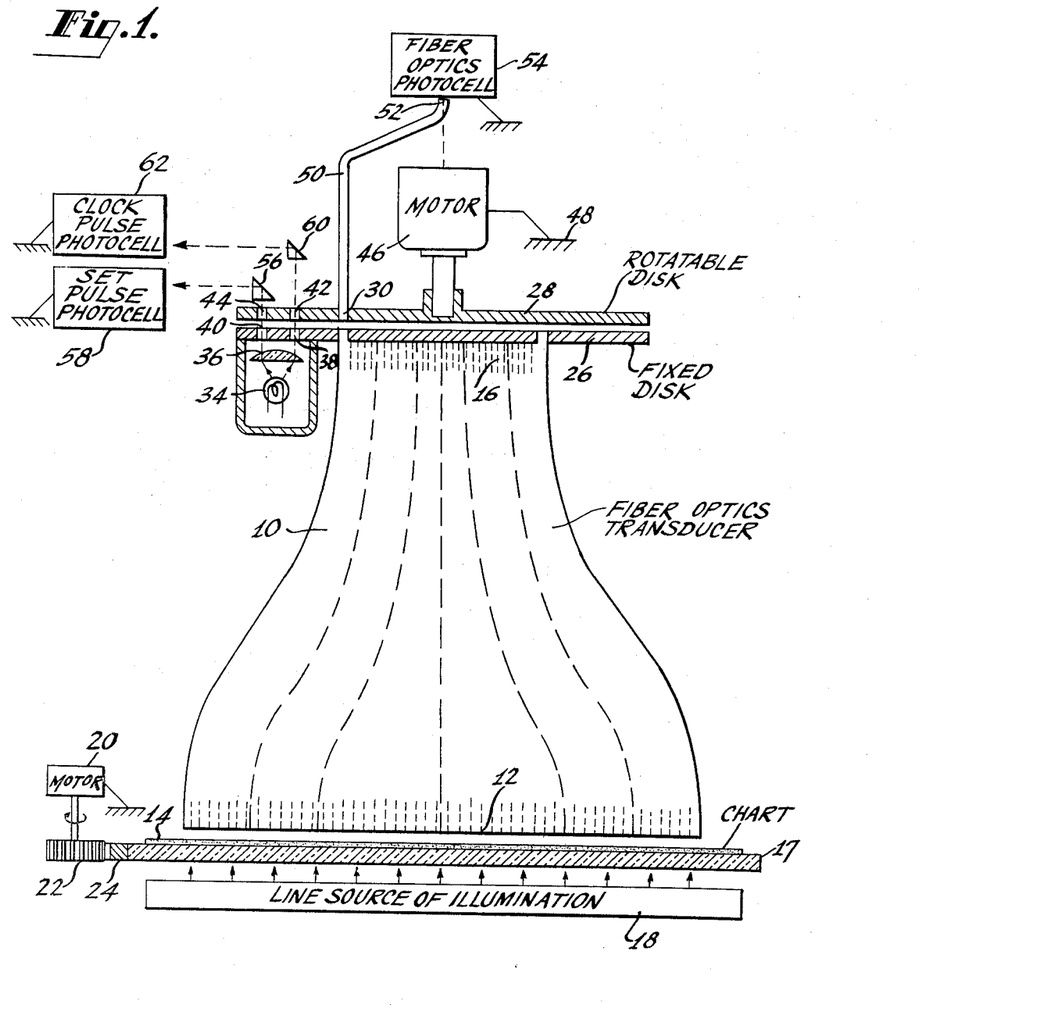
FIG. 1 is a block and schematic showing of a chart reader according to the present invention.

The chart reader of FIG. 1 includes a fiber optics transducer 10. The transducer consists of a large number of small diameter transparent fibers. For example, the fibers may each be .003″ or less in diameter. The fibers can be made of glass, quartz, nylon, polystyrene or other synthetic materials. Preferred materials, however, are glass and quartz since they have a uniform index of refraction and transmit light in a highly efficient manner.

The light which passes down each fiber is constrained within the walls of the fiber by virtue of total internal reflection due to a difference in the index of refraction between the material of which the fiber is made and the material surrounding the fiber. When the fibers are bound into a bundle, as in the transducer of FIG. 1, it is preferred to coat each fiber with a material having an index of refraction lower than that of the fiber to lessen light leakage.

One end 12 of the transducer is formed as a straight or curved line of fibers depending on the type of curve being read, and it is positioned immediately adjacent to a chart 14. The other end 16 of the transducer is formed into a circle or semicircle. In a typical system, the end 12 of the chart may be 6 inches long, and the upper end of the transducer may be on the arc of a circle having a 4 inch diameter.

Chart 14 rests on a transparent holder 17. Line source of illumination 18 is parallel to and immediately under the end 12 of the transducer so that light passes through the holder 17 and the chart 14 and onto the fibers at end 12. The holder 17 and chart are driven by a motor 20 and pinion 22. The pinion 22 engages a gear rack 24 which is fixed to the holder 17.

Figure 2:
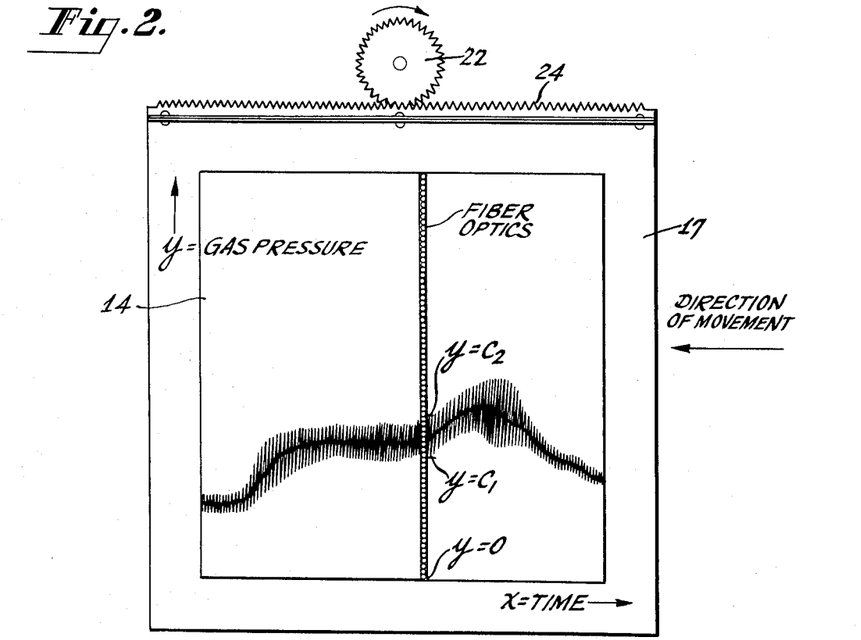
FIG. 2 is a plan view rotated 90° of the chart and its holder showing how the chart is moved with respect to the fiber optics transducer.

The pinion 22 and gear rack 24 are shown in plan view in FIG. 2. This figure also shows the transparent holder 17, the chart 14, and the line 12 of fiber optics. The curve is made up of short lines or strokes parallel to the $y$ axis (parallel to edges of the chart) and is made by a rectilinear recorder. The line of fiber optics is arranged parallel to these short lines and the chart is driven by the pinion 22 in the $x$ direction.

In cases in which the curve is made by a pen which is mounted at one end of an arm, the other end of which pivots, the line written by the pen is in the form of an arc rather than a line parallel to the $y$ axis. In such cases it is preferred that linear end 12 of the fiber optics transducer be curved also so as to conform with this arc. The end 12 may be made flexible so that it can be made to conform to traces drawn by rectilinear recorders (those in which the pen moves in a direction at right angles to the direction of chart movement), and curvilinear recorders (those with a pen on an arm mounted at one end to a fixed pivot point) of different pen arm radii.

Figure 3:
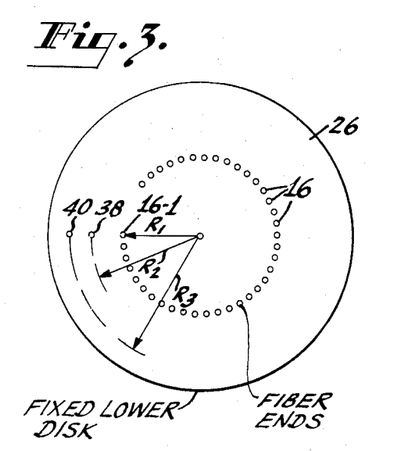
FIGS. 3 and 4 are plan views of the fixed and rotatable disks of the system of FIG. 1.
Figure 4:
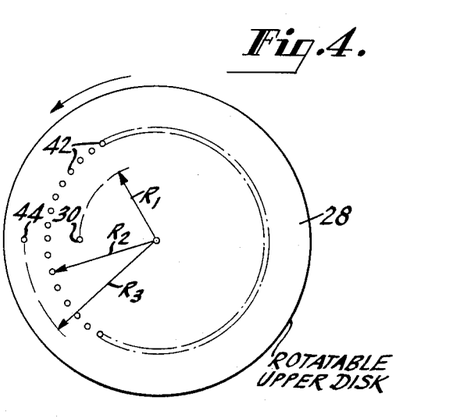

Returning to FIG. 1 and referring also to FIGS. 3 and 4, the semicircular end 16 of the fiber optics transducer is imbedded in a fixed, lower disk 26. The fibers are at a radius $R_1$ from the center of the disk and may be seen through the regularly spaced apertures in the lower disk 26. An upper disk 28, which is rotatable, is aligned with the lower disk and contains a single aperture 30 of the same diameter as that of each of the spaced apertures in the lower disk and at the same radius $R_1$ from the center of the disk. Thus, looking through aperture 30, one sees through one aperture in the lower disk at a time as the upper disk 28 rotates with respect to the lower disk.

Fixed to the lower disk 26 is a housing in which are mounted a source of light 34 and a lens system which is shown in the figure as a single lens 36. Light from a source 34 is directed by the lens through two apertures 38 and 40 in the lower disk. These apertures are at radii $R_2$ and $R_3$, respectively, from the center of the disk as is more easily seen in FIG. 3. It is to be understood, of course, that $R_2$ can be greater than $R_3$, if desired.

The upper rotatable disk 28 is formed with regularly spaced apertures 42 at radius $R_2$ from the center of the upper disk. Thus, as the upper disk rotates with respect to the lower disk, light passes from aperture 38 through successive ones of apertures 42. These light pulses are the clock pulses for a computer, as will be described in more detail later. The upper disk 28 is formed with a single aperture 44 at radius $R_3$. This aperture receives light from aperture 40 in the lower disk, once each disk rotation, and this light reception generates the set pulse for the computer, as also is explained in more detail later.

The upper disk 28 is rotated by a motor 46. The motor is fixed to the chassis (not shown, but indicated schematically by the symbol 48).

Light from the fiber ends received at aperture 30 in the rotatable disk passes through a transparent light conducting rod, or, alternatively, a bundle of small diameter fiber optics. The conductor, shown at 50, is secured at one end to the disk 28, and rotates with the disk. The end 52 of the light conductor 50 lies over the center of the disk so that it guides light to the same position in space as the disk rotates. Light from rod 52 is projected onto a photocell 54 legended "Fiber Optics Photocell." Light passing through hole 44 is conducted through an optical system, shown as a prism 56, to a photocell 58. This is legended "Set Pulse Photocell." Light passing through one of holes 42 is conducted through an optical system, shown as a prism 60, to the "Clock Pulse Photocell" 62.

In operation, aperture 30 in the upper disk is initially positioned over the portion 16–1 of the fibers imbedded in the lower disk. The motor rotates the upper disk counter-clockwise. The disk rotation is at a relatively rapid rate such as 3,600 revolutions per minute. The end 12 of the fiber optics transducer 10 is initially positioned parallel to the $y$ axis and at the $x=0$ coordinate. Light passes from line source of illumination 18 through chart 14 and onto the end 12 of the fiber optics transducer.

The chart is moved to the left as viewed in FIG. 2 by the motor 20 and pinion 22. Motor 20, incidentally, may instead be a connection through gearing from motor 46 as discussed later in connection with FIG. 7. Motor 20 moves chart 14 at a speed much slower than the rotational speed of the lower disk. For example, it may require 10 seconds to scan the entire chart along the $x$ coordinate. In other words, it may require 600 rotations of the rotatable disk to move the chart from the $x=0$ position to the chart extremity. With a slightly different type of drive system, a long strip chart may easily be read. The drive system may, in this case, unwind the chart from one reel and take it up on another.

A typical transport speed well within the capability of the present chart reading system is 10 feet of chart per minute.

Looking into hole 30, as the upper disk rotates, one sees a series of light pulses which start at the time equivalent of $y=0$. As soon as the curve is reached, the pulses stop. The pulses begin again at a time dependent on the trace thickness. After one revolution of the upper disk, the curve is scanned again in the $y$ direction. The $x$ coordinate now is slightly different, the curve having moved to the left a distance 1/600 of the entire curve distance.

A typical curve to be scanned is shown in FIG. 2. It is a measure of gas pressure ($y$) as a function of time ($x$) and may have been made previously by a pen on a moving chart. The variation in trace thickness indicates differences in the short time fluctuations of gas pressure about a varying average during different time intervals. This may be due, for example, to changing amounts of consumption and other changing system parameters. For certain purposes it is desirable to know the average gas pressure at a given time and it is therefore important to be able to determine the $y$ coordinate at the center of the trace.

Figure 5:
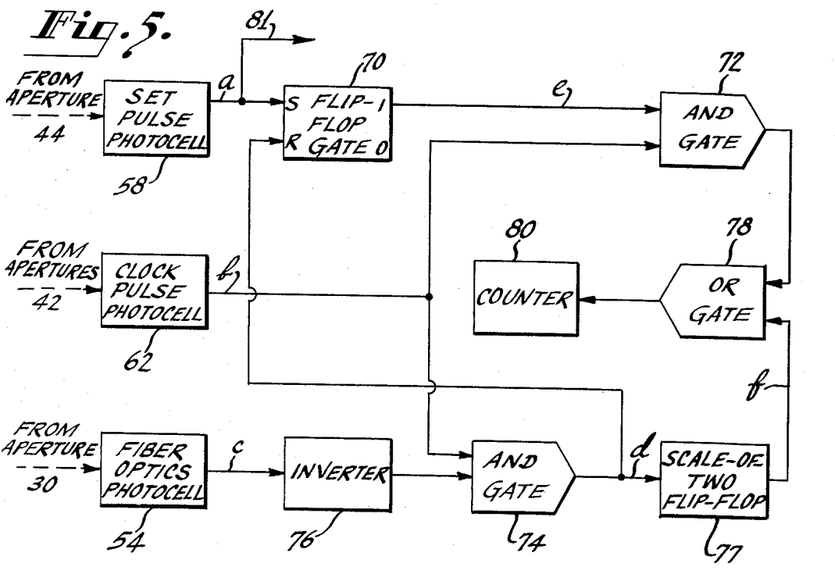
FIG. 5 is a block diagram of a portion of a computer to which the optical outputs of the system of FIG. 1 are applied.

The computer shown in FIG. 5 enables one to determine the distance to the center of the trace. The photocells 58, 62, and 54 are those shown in FIG. 1. They receive light from the various apertures in the upper disk as is indicated by the legend and the dashed arrows. Photocell 58 is connected to the set input terminal of a flip-flop gate 70. The one output of the flip-flop, which is activated when the flip-flop is set, serves as an enabling signal to "and" gate 72.

Photocell 62 applies its output to "and" gate 72 and to "and" gate 74. Photocell 54 applies its output through an inverter 76 to "and" gate 74. "And" gate 74 is connected to a scale of two flip-flop 77. This flip-flop and "and" gate 72 are connected through an "or" gate 78 to counter 80.

Figure 6:
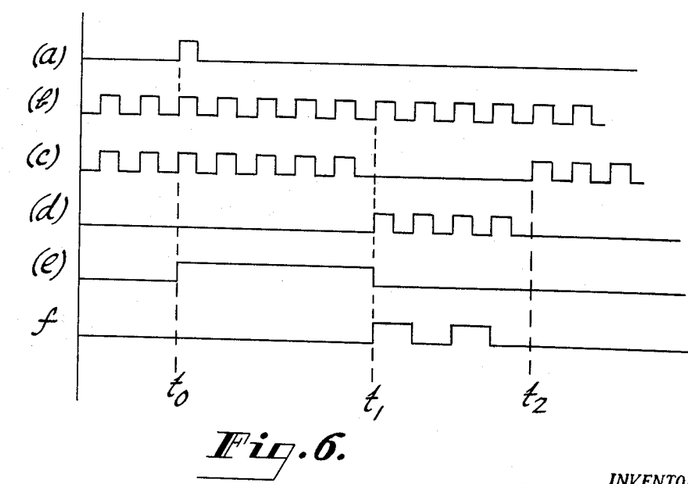
FIG. 6 is a drawing of waveforms present at various points in the circuit of FIG. 5.

In the following discussion of the operation of FIG. 5, FIG. 6 should also be referred to. It may be assumed that flip-flop gate 70 is reset so that the one output of the flip-flop is low and "and" gate 72 is not enabled. As the upper disk starts rotating, a set, light pulse from aperture 44 is applied to photocell 58. An electrical pulse $a$ from the photocell sets flip-flop 70. Clock pulse photocell 62 receives light clock pulses from apertures 42 and converts these to electrical pulses $b$. Pulses $b$ are the second input to "and" gate 72. Thus, the "and" gate 72 produces output pulses like $b$ and these are applied through "or" gate 78 to counter 80. The counter therefore begins to count pulses at $x=0$. This counter may be one in a process control computer and it can take many forms. For example, the counter may be one for producing a binary number indicative of the number of pulses it receives.

Photocell 54 receives light pulses from aperture 30. These are converted to electrical pulses $c$ which are inverted by stage 76 and applied as one input to "and" gate 74. The second input to the "and" gate 74 receives clock pulses $b$. In view of the inversion action of inverter 76, the inverted pulses $c$ are 180° out of phase with the clock pulses $b$ at the "and" gate 74 so that the "and" gate 74 produces no output. At time $t_1$, the time at which the rotating disk observes the start of the trace, the fiber optics pulses $c$ stop. The inverter output is therefore a high amplitude signal equivalent to a binary "one" and "and" gate 74 produces output pulses $d$ at the same frequency as the clock pulses $b$. Pulses $d$ are applied to the reset terminal of flip-flop gate 70, resetting the flip-flop. This produces a low output at the "one" output terminal of the flip-flop and "and" gate 72 is thereby inactivated. Thus, counter 80 no longer receives any input from "and" gate 72.

Pulses $d$ are also applied to a scale of two flip-flop 77.

This flip-flop produces output pulses $f$ at a frequency one-half that of the input pulses thereto. These are applied through "or" gate 78 to counter 80. At time $t_2$, the rotatable disk has moved aperture 30 through the trace thickness and the light pulses are again received at photocell 54 from the fiber ends. The first one of the resulting electrical pulses $c$ which passes through inverter 76 now disables "and" gate 74. Thus, the pulses $d$ from the "and" gate cease.

It may be recalled that flip-flop gate 70 is in a reset condition so that counter 80 receives no pulses from "and" gate 72. Likewise "and" gate 74 is disabled so that the counter receives no pulses from the scale of two flip-flop 77. The result is that a count is recorded in the counter which is equal to the number of clock pulses from the $y=0$ portion to the start of the trace, and one-half the number of clock pulses equivalent to the trace thickness. The count recorded is therefore an indication of the distance from the $y=0$ position to the $y=C_1$ position (see FIG. 2) plus one-half the distance from $y=C_1$ to $y=C_2$. This, in fact, is the distance to the center of the trace, regardless of the trace thickness.

The circuit shown in FIG. 5 produces a count at counter 80 indicative of the $y$ coordinate of a chart at a given $x$ coordinate. The $x$ coordinate may be indicated by the set pulse from stage 58. An output from this stage to the computer is indicated schematically at lead 81 (FIG. 5).

The various circuits of FIG. 5 are illustrated in block rather than schematic form as they are all standard digital computer circuits. Further details of such circuits may be found in any standard textbook such as Richards, Arithmetical Operations in Digital Computers, for example.

In the system of FIG. 1, the chart is illuminated by passing light through the chart. In some applications, it is preferable to illuminate the chart from the top and to read the chart by reflection. For example, the chart may have markings on its back and this would make the method of FIG. 1 for illuminating the chart unsatisfactory.

Figure 7:
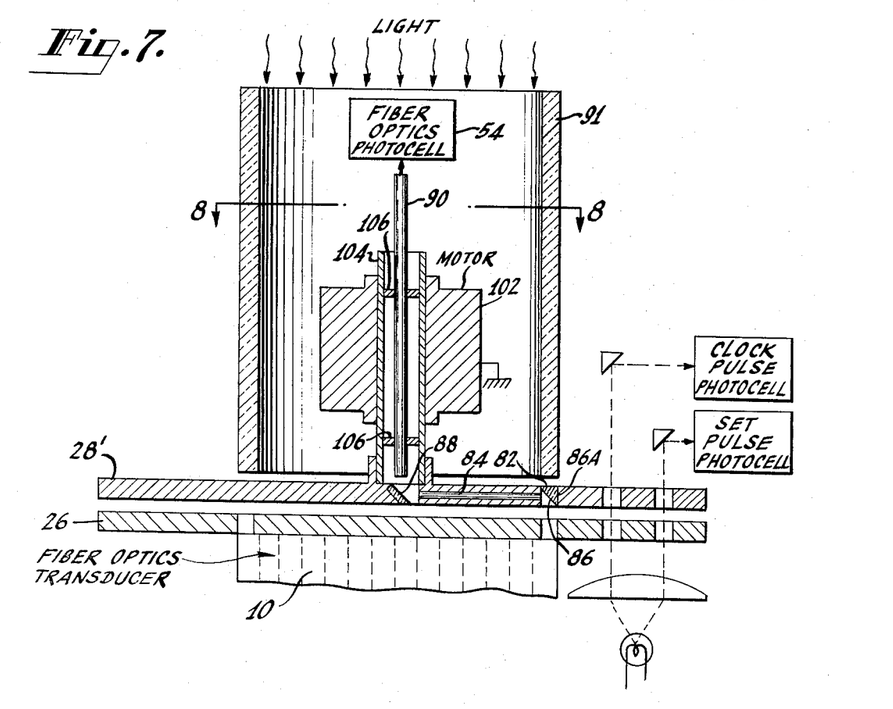
FIG. 7 is a drawing of a portion of another embodiment of the present invention.
Figure 8:
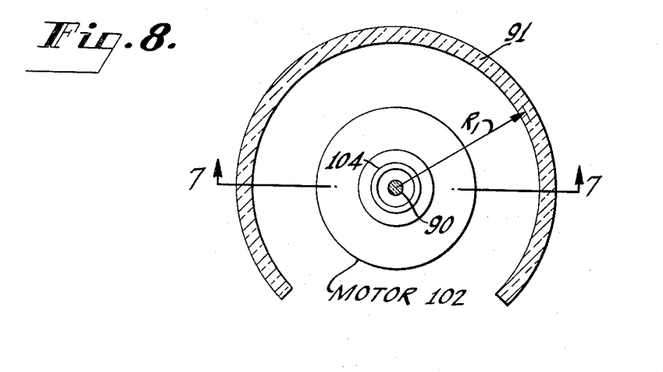
FIG. 8 is a section along line 8—8 of FIG. 7.

The arrangement shown in part in FIG. 7 permits viewing the chart by reflected light. The fiber optics transducer 10 is identical with the one of FIG. 1 and is therefore shown only in part. The chart itself is not shown in FIG. 7 but it may be similar to the one shown in FIG. 1. The holder for the chart is preferably opaque rather than transparent. The lower disk 26 of the system of FIG. 7 is like the one of FIGS. 1 and 3. The upper disk 28' is somewhat different than the one of FIGS. 1 and 4. Disk 28' includes at radius $R_1$, a semi-transparent mirror 82. This mirror is of triangular cross-section and fits into a square aperture in the disk. Wall 86A of the mirror is preferably coated with optical black to lessen undesired reflections. A light conductor 84 of circular cross-section which may be a glass tube, a glass fiber rod, or a highly polished hollow tube permits light reflected from the lower surface 86 of the mirror to pass to a reflecting mirror 88 positioned at the center of the upper disk. Over the reflecting mirror 88 and positioned on the axis of disk rotation is a light conducting cylinder 90 similar to the light conductor 84. Light reflected from reflecting mirror 88 through the cylinder 90 is applied to the fiber optics photocell 54.

As an alternative to the light conducting arrangement described above, a single fiber optics rod may replace elements 90, 88, and 84. In this case, the aperture at the center of the upper disk is enlarged to permit a gradual 90° bend to be made in the rod. An advantage of this arrangement is that the mirror 88 is eliminated as is the step of properly aligning the mirror.

Figure 9:
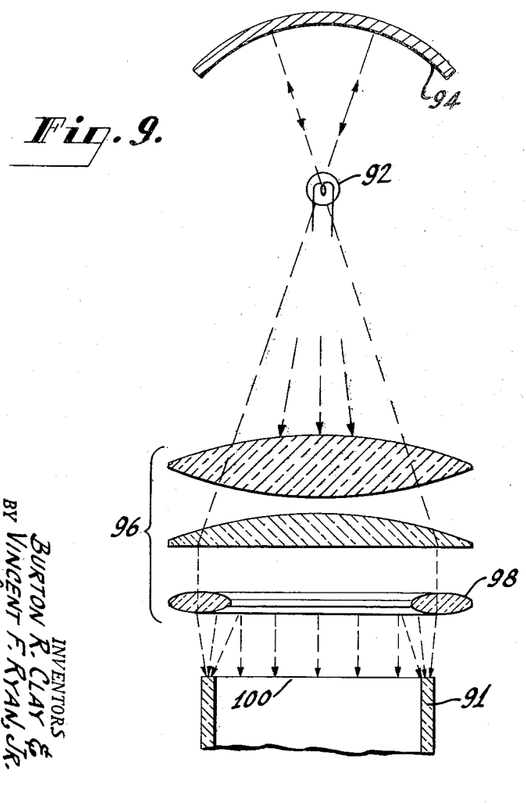
FIG. 9 is a cross-sectional view of an arrangement for projecting light onto the system of FIG. 7.

The top illumination for the chart is provided by a partly cylindrical Pyrex member 91. The member 91 has a radius $R_1$. At one end, the member 91 receives light from a collimating system shown in more detail in FIG. 9. The system includes a source of light 92, a reflector 94, and a lens system 96. The lower one 98 of the lenses resembles a torus and focuses light onto the semi-circular cylinder end 100.

Returning to FIG. 7, the motor for rotating the upper disk is shown at 102. The motor shaft 104 is hollow. The light conducting member 90 can be fixed to the hollow shaft as by means of supports 106. In this case, the light conducting member rotates with the motor shaft. Alternatively, member 90 can be fixed to the light conducting element 91 in which case conductor 90 will remain fixed as the motor shaft rotates.

In operation, the chart being scanned is illuminated by the light applied to the glass semi-cylinder 91. This light passes through the cylinder, through the semi-transparent mirror 82 and through the fiber optics transducer 10 to the chart. Light reaching the chart is reflected from it and back through the fiber optics transducer to the lower surface 86 of mirror 82. This light passes through channel 84 in the upper disk and is reflected from mirror 88 through light conductor 90 to photocell 54.

Figure 10:
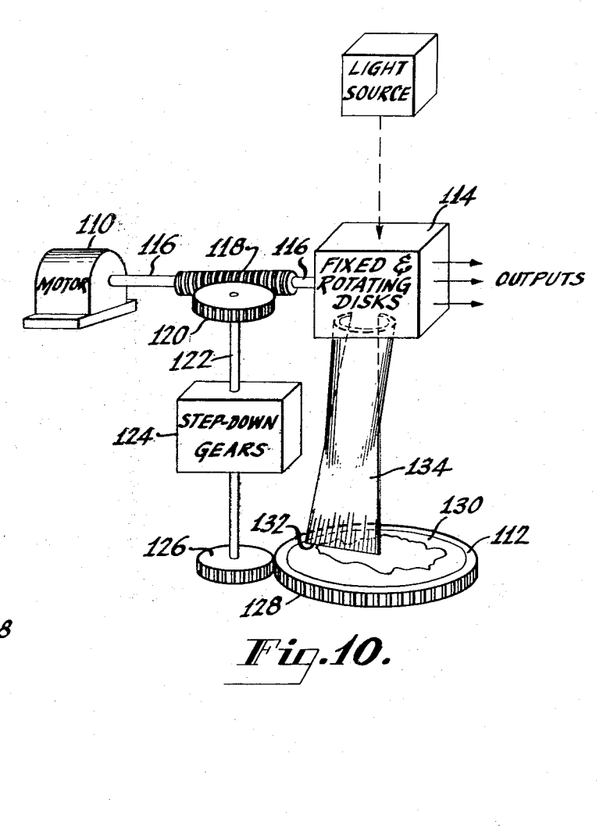
FIG. 10 is a diagrammatic, perspective showing of the system of FIG. 7.

A perspective, schematic view of the arrangement of FIG. 7 with certain modifications is shown in FIG. 10. The fixed and rotating disks and associated elements which are shown in detail in FIG. 7 are shown by a single block 114 in FIG. 10. The same motor 110 drives the chart holder 112 and the upper disk in block 114. This motor may be connected directly via shaft 116 to a pinion (not shown) engaged with a gear (also not shown) on the peripheral edge of the upper disk. Fixed to shaft 116 is a gear 118 which drives a pinion 120. The pinion is connected via shaft 122 and step-down gears 124 to a second pinion 126. This second pinion engages a gear 128 on the peripheral edge of the chart holder.

The chart 130 itself is circular rather than square, although this is not essential to the system of FIG. 7 and is equally applicable to that of FIG. 1. The line end 132 of the fiber optics transducer 134 therefore lies on a radius of the chart. As in the embodiment of FIGS. 1 and 7, the chart moves much more slowly than the rotating disk. For example, the upper disk rotations may be on the rate of 3,600 revolutions per minute and the chart rotation at 6 revolutions per minute. In this system, the chart is scanned in 10 seconds and there are 600 radial scans of the chart per chart revolution. It will be appreciated, of course, that these speeds are merely examples and that different ratios of chart movement to disk movement will result in a different number of radial scans of the chart.

Figure 11:
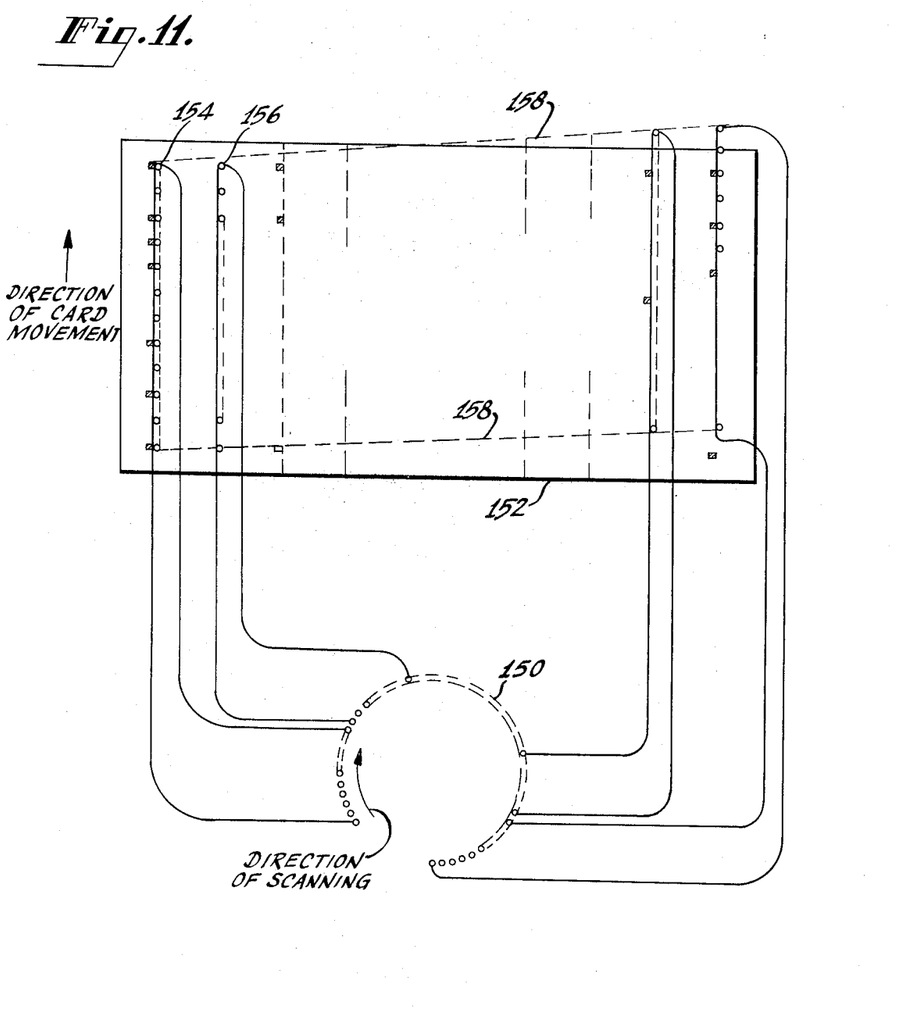
FIG. 11 is a drawing of a portion of an embodiment of the invention which is suitable for reading a punched card.

The embodiment of the invention as shown in part in FIG. 11 is for reading a punched card such as an IBM card. The fiber optics transducer is arranged in a circle or a semi-circle 150 at the end of the transducer imbedded in the lower fixed disk. The disk itself is not shown but it and the remainder of the system is similar to the one of FIG. 1. The end of the transducer adjacent to the card 152 is formed into spaced rows of fibers 154, 156 and so on, each row being positioned over a column of holes in the card. Note that the rows 154, 156 and so on of fibers are slightly offset from one another as is indicated by dashed lines 158. This offset is necessary to compensate for the movement of the card during the scanning of the semi-circular end of the fiber optics transducer.

In the operation of the reader of FIG. 11, the card is moved in the upward direction as viewed in the figure and the semi-circular end of the transducer is scanned in the clockwise direction. The card is illuminated from behind so that when a hole is present, light passes through the hole and through the fiber optics transducer to the semi-circular end 150 of the transducer. Thus, as the semi-circular end 150 is scanned, the presence or absence of holes in the card is readily determined.

The fiber optics transducer and fixed and rotating disks of the various embodiments of the invention may be made in a number of ways. In one method, the fibers at the end 16 of the transducer are first placed in a fixture appropriately spaced from one another and lying on an arc of a circle. The fibers may be individually spaced or may be bound off into small bundles which are spaced from one another. The ends of the fiber then can be placed in a mold shaped to form the lower disk and a black epoxy resin poured into the mold and allowed to harden. The fixture may then be removed and the upper surface of the lower disk and the slightly projecting fiber ends polished to form a smooth surface. The mold may then be drilled to provide the entrance holes 38 and 40.

The upper rotatable disk can be made in the same way as the lower one.

The end 12 of the fiber optics transducer should preferably be made flexible for reasons mentioned previously. This can be done by placing the lower end in a jig to properly position the fibers, and then bonding the fibers to a flexible member such as Phosphor bronze strip. Preferably, a flexible cement is used to bond the fibers to the strip. After the cement has hardened, the fibers bonded to the Phosphor bronze strip may be removed from the fixture and the end 12 then clamped in a template. The end 12 is then polished so as to provide a uniform line of fibers. If, on the other hand, flexibility is not required, that is, if the fibers are designed to read only a single type of chart, an epoxy resin may be used to bond the fiber ends and the Phosphor bronze strip eliminated.

What is claimed is:

1. In an arrangement for converting an optically represented quantity into a digital quantity, in combination, a fiber optics transducer arranged adjacent to the optically represented analog quantity at one end of the transducer; means for scanning the other end of the transducer to obtain light pulses and means for counting said light pulses to obtain an indication of the value of the quantity.

2. In an arrangement for reading a curve, in combination, means for producing a count indicative of the distance in units $u$ between a reference position and a point on the curve; means for producing a count indicative of the width of the curve at said point in units $2u$; and means for adding the two counts.

3. In a curve reader, a fiber optics transducer positioned adjacent to a curve to be read and parallel to one coordinate of the curve at one end of the transducer; and means for scanning the other end of the fiber optics transducer to obtain an output indicative of the value of said coordinate at the position of the curve at which the transducer lies adjacent to the curve.

4. In a curve reader, a fiber optics transducer positioned adjacent to a curve to be read and parallel to one coordinate of the curve at one end of the transducer; means for scanning the other end of the fiber optics transducer to obtain an output indicative of the value of said coordinate at one point on the curve; and means for producing relative movement between the curve and said one end of the fiber optics transducer in the direction of another coordinate of the curve.

5. In a curve reader, a fiber optics transducer positioned adjacent to a curve to be read and parallel to a curve coordinate at one end of the transducer, the other end of said transducer being arranged on a circle; means including a photocell for scanning the fibers arranged on the circle to obtain a number of light pulses proportional to the value of said coordinate at one point on the curve; and means for moving the curve with respect to the end of the transducer adjacent to the curve in a direction at an angle to said curve coordinate.

6. In a system in which a fiber optics transducer is employed to read optical data, an arrangement for illuminating the data by reflected light comprising means for applying light to the data through the same fiber optics transducer which receives the light reflected from the data.

7. In a system in which a fiber optics transducer is employed to read optical data, an arrangement for illuminating the data by reflected light comprising a semi-transparent mirror the reflecting surface of which is at an acute angle to and in line with one end of the fiber optics transducer; and means for applying light to the fiber optics transducer through said mirror.

8. In a curve reader, a fiber optics transducer positioned adjacent to a curve to be read at one end of the transducer, the other end of the transducer being arranged on a circle; a first disk in which said other end of said transducer is fixed at a given radial distance from the center of the disk, said disk being formed with spaced apertures aligned with said other end of said transducer; a rotatable second disk adjacent and parallel to said first disk and formed with an aperture at said radial distance from the center of the second disk; a photocell arranged to receive light passing through the aperture in the rotatable disk during the rotation thereof; means for illuminating said chart; and means for rotating said rotatable disk.

9. In a curve reader as set forth in claim 8, said one end of said transducer being arranged on a line.

10. In a curve reader as set forth in claim 8, further including means operatively associated with said rotatable disk for producing clock pulses at a frequency dependent on the speed of disk rotation.

11. In an arrangement as set forth in claim 10, further including means operatively associated with said rotating disk for producing a reference pulse at least once each cycle of disk rotation.

12. In a curve reader as set forth in claim 9, further including means for moving the curve being read with respect to said one end of said transducer in a direction perpendicular to the line in which said one end of said transducer is arranged.

13. In combination, a medium containing visible data; means for illuminating the data; means for moving said medium; a fiber optics transducer having an input end which receives the data and having also an output end; and means for scanning said output end of said transducer during the movement of said medium for producing signals in time sequence indicative of the value of said data.

14. In the combination as set forth in claim 13, said medium comprising a perforated member.

15. In the combination as set forth in claim 13, said medium comprising a punched rectangular card formed with holes arranged in columns and rows and with the columns arranged parallel to the short dimension of the card, said transducer input end comprising a plurality of parallel lines of fibers, one for each column of holes, and said card movement being in a direction parallel to the columns of holes in the card.

16. In the combination as set forth in claim 15, said lines of fibers being offset with respect to one another in the direction of movement of the card to permit alignment of the holes in the succeeding columns of the card with the succeeding columns of fibers, as the succeeding columns of holes are scanned.

17. In an arrangement for converting a parameter of a curve recorded on a recording medium into a digital quantity, in combination, a fiber optics transducer arranged adjacent to the recording medium and parallel to a curve coordinate representing said parameter at one end of the transducer; means for scanning the other end of the transducer to obtain a number of light pulses indicative of the spacing between a reference value of said parameter on said recording medium and the curve; and means for producing a count of the number of said pulses.

18. An arrangement for converting a curve recorded on a recording medium in a two coordinate system into digital information comprising, in combination, means for successively scanning the space along a line parallel to one of the coordinates of the curve between a reference value of the coordinate and the curve for producing successive counts proportional to the extent of said space; and means for changing the position of said line in a direction parallel to the other curve coordinate so that successive ones of said scans intercept successive parts of the curve.

19. An arrangement for converting the X and Y coordinates of a curve into digital information comprising, in combination, means for successively scanning the space along a line parallel to one of said coordinates between the zero value of the coordinate and the curve for producing successive counts proportional to the extent of said space; and means for changing the position of said line in a direction parallel to the other curve coordinate so that successive ones of said scans intercept successive parts of the curve.

20. In a system in which a fiber optics transducer is employed to read recorded data, an arrangement for illuminating the data by reflected light comprising a semi-transparent mirror the reflecting surface of which is at an acute angle to and in line with one end of the fiber optics transducer; means for applying light to the fiber optics transducer through said mirror for illuminating the data; and means for receiving the light reflected from the data through the transducer and from said semi-transparent mirror.

21. In a system as set forth in claim 20, said semi-transparent mirror comprising a prism and said means for receiving the light including fiber optics means arranged at one end adjacent to the reflecting surface of said prism.

22. An arrangement for converting a curve recorded on a recording medium in a two coordinate system into digital information comprising, in combination, means for successively scanning the space along a line parallel to one of the coordinates of the curve between a reference value of the coordinate through the curve to the furthest edge of the curve for producing successive counts proportional to the extent of the distance along said line between said reference value of said coordinate and the center of said curve; and means for changing the position of said line in a direction parallel to the other curve coordinate so that successive ones of said scans intercept successive parts of the curve.

23. In the arrangement as set forth in claim 22, said means for successively scanning including: means for producing a count indicative of the distance in units $u$ between the reference value of the coordinate and the start of the curve; means for producing a count indicative of the width in units $2u$ of the curve; and means for adding the two counts.

24. An electro-optical scanning system comprising, a fiber optical bundle including a plurality of optically isolated light transmitting fibers terminating at one end in an image plane and at the other end in a scanning plane, the fiber ends in the scanning plane being arranged in a circle, and means for applying a light image to the fiber ends in the image plane for transmission by the fibers to the scanning plane, and scanning means including a stationary photoelectric pickup unit facing the scanning plane and a rotating scanner adjacent the scanning plane having a light transmitting aperture therein progressively scanning the circularly arranged fiber ends in the scanning plane for pulsing the photoelectric pickup unit and creating electrical pulses in accordance with the light intensities at said fiber ends.

25. An electro-optical scanning system comprising, a fiber optical bundle including a plurality of optically isolated light transmitting fibers terminating at one end in an image plane and at the other end in a scanning plane, the fiber ends in the scanning plane being arranged in a circle, the fiber ends in the image plane being arranged in an area pattern, means for applying a light image to the fiber ends in the image plane for transmission by the fibers to the scanning plane, and scanning means including a stationary photoelectric pickup unit facing the scanning plane and a rotating scanner having a light transmitting aperture therein adjacent the scanning plane progressively scanning the circularly arranged fiber ends in the scanning plane for pulsing the photoelectric pickup unit and creating electrical pulses in accordance with the light intensities at said fiber ends.

26. An electro-optical scanning system comprising, a fiber optical bundle including a plurality of optically isolated light transmitting fibers terminating at one end in an image plane and at the other end in a scanning plane, the ends of the fibers in the image plane being regularly arranged in rows in an area pattern and the other ends of the fibers in the scanning plane being respectively regularly arranged in a circle, means for applying a light image to the fiber ends of the image plane for transmission by the fibers to the scanning plane, and scanning means including a stationary photoelectric pickup unit facing the scanning plane and a rotating scanner having a light transmitting aperture therein adjacent the scanning plane progressively scanning the circularly arranged fiber ends in the scanning plane for pulsing the photoelectric pickup unit and creating electrical pulses in accordance with the light intensities at said fiber ends.

27. An electro-optical scanning system comprising, a fiber optical bundle including a plurality of optically isolated light transmitting fibers terminating at one end in an image plane and at the other end in a scanning plane, the fiber ends in the scanning plane being arranged in a circle, the ends of the fibers in the image plane being arranged in a single row, means for moving an object to be scanned past the single row of fiber ends in the image plane and for applying a light image thereof to the fiber ends in the image plane for transmission by the fibers to the scanning plane, and scanning means including a stationary photoelectric pickup unit facing the scanning plane and a rotating scanner having a light transmitting aperture therein adjacent the scanning plane progressively scanning the circularly arranged fiber ends in the scanning plane for pulsing the photoelectric pickup unit and creating electrical pulses in accordance with the light intensities at said fiber ends.

28. Electro-optical scanning apparatus comprising, in combination, a multiplicity of optically insulated, adjacent, light transmitting fibers; means anchoring said fibers at one end in linear array of elemental-area width; means anchoring the opposite ends of the fibers in circular array; means to feed a record sheet in substantially flat form along a path parallel to said linear array of fibers; and scanning means for simultaneously projecting light onto and receiving light from successive elemental portions of said circular array of fibers.

References Cited by the Examiner

UNITED STATES PATENTS

| 2,583,132 | 1/1952 | Altar et al. | 250—227 |
|---|---|---|---|
| 2,616,983 | 11/1952 | Zworykin et al. | 178—6 |
| 2,915,242 | 12/1959 | Doll | 235—61.6 |
| 2,938,666 | 5/1960 | Rand | 235—61.115 |
| 2,943,208 | 6/1960 | Shepard et al. | 235—61.115 |
| 3,125,013 | 3/1964 | Herrick et al. | 88—1 |

FOREIGN PATENTS 335,122   2/1959   Switzerland.

DAVID G. REDINBAUGH, *Primary Examiner.*

CORNELIUS D. ANGEL, STEPHEN W. CAPELLI,
*Examiners.*

D. W. COOK, M. GINSBURG, R. L. RICHARDSON,
*Assistant Examiners.*